(12) United States Patent  (10) Patent No.: US 8,671,800 B2
Cibien                     (45) Date of Patent:     Mar. 18, 2014

(54) MECHANICAL TRANSMISSION DEVICE BETWEEN A DRIVE SHAFT AND TWO DRIVEN SHAFTS

(75) Inventor: Angelo Cibien, San Colombano al Lambro (IT)

(73) Assignee: Bi.Ci.Di. S.R.L., San Colombano al Lambro (MI) (IT)

( * ) Notice: Subject to any disclaimer, the term of this patent is extended or adjusted under 35 U.S.C. 154(b) by 267 days.

(21) Appl. No.: 13/378,020

(22) PCT Filed: May 21, 2010

(86) PCT No.: PCT/EP2010/057066
§ 371 (c)(1),
(2), (4) Date: Dec. 13, 2011

(87) PCT Pub. No.: WO2010/145917
PCT Pub. Date: Dec. 23, 2010

(65) Prior Publication Data
US 2012/0090429 A1    Apr. 19, 2012

(30) Foreign Application Priority Data
Jun. 18, 2009 (IT) .............. MI2009A1076

(51) Int. Cl.
*F16H 48/12* (2012.01)

(52) U.S. Cl.
USPC ............ 74/650; 74/724; 74/665 F; 74/665 H; 74/665 S; 74/665 P; 475/228

(58) Field of Classification Search
USPC ...... 74/650, 665, 665 F, 665 H, 665 S, 665 P, 74/724; 192/36, 46, 48.8, 48.9, 50, 54.1, 192/54.2; 475/8, 228
See application file for complete search history.

(56) References Cited

U.S. PATENT DOCUMENTS

| 849,474 | A | * | 4/1907 | Hedgeland | 74/650 |
| 1,406,211 | A | * | 2/1922 | Myers | 74/650 |
| 6,010,426 | A | * | 1/2000 | Nakamura | 477/22 |
| 7,210,567 | B2 | * | 5/2007 | Cibien | 192/48.8 |
| 7,513,347 | B2 | * | 4/2009 | Cibien | 192/36 |
| 2005/0211527 | A1 | * | 9/2005 | Cibien | 192/48.92 |
| 2006/0027039 | A1 | * | 2/2006 | Cibien | 74/425 |
| 2006/0213741 | A1 | | 9/2006 | Wieber et al. | |

FOREIGN PATENT DOCUMENTS

| EP | 1624217 A1 | 2/2006 |
| EP | 1860340 A1 | 11/2007 |

* cited by examiner

*Primary Examiner* — Troy Chambers
*Assistant Examiner* — Valentin Craciun
(74) *Attorney, Agent, or Firm* — Volpe and Koenig, P.C.

(57) ABSTRACT

A transmission device includes a drive shaft and two driven shafts. The drive shaft is connected to a wheel and first engagement rotors are arranged therebeside so that the wheel is located therebetween and can rotate together with them. The first engagement rotors having an axial hole in which a driven shaft is rotatably arranged, the first engagement rotors are coupled or uncoupled with second engagement rotors coaxially arranged therebeside, by extracting or retracting, respectively, at least one mobile tooth rotatable in a seat of the first engagement rotors, each driven shaft being keyed to a second engagement rotor. Driving rotors are arranged around the driven shafts between the wheel and the first engagement rotors and are provided with a brake, so that relative rotation of the driving rotors with respect to the first engagement rotors causes extension or retraction of the mobile tooth according to the relative rotation direction.

7 Claims, 4 Drawing Sheets

Figure 1:
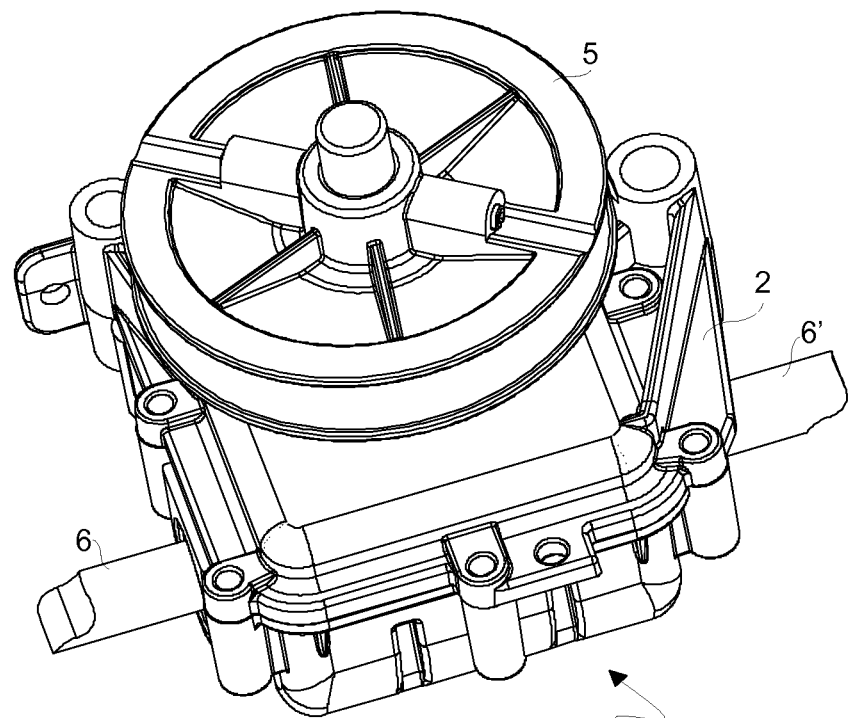

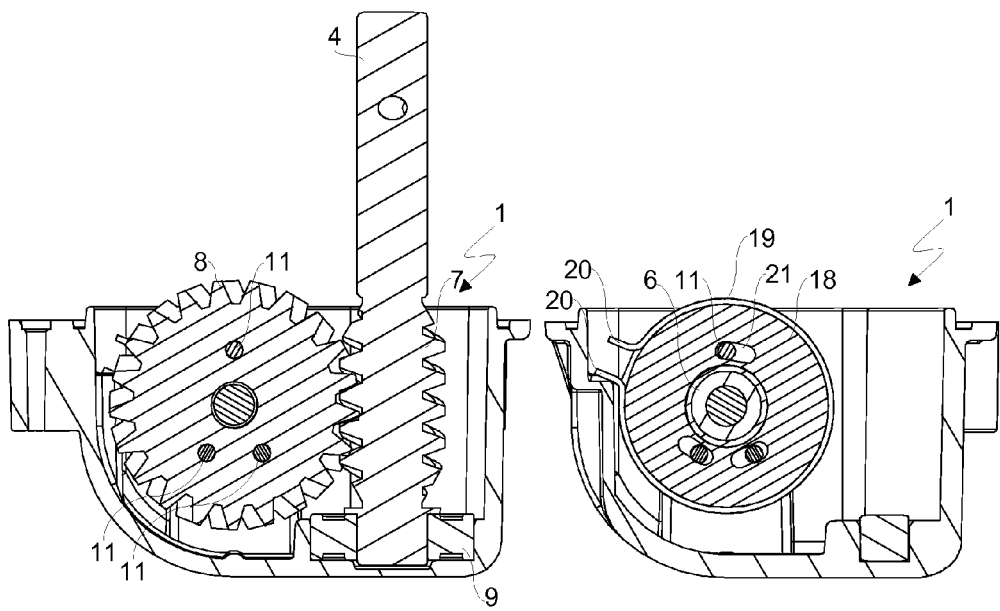
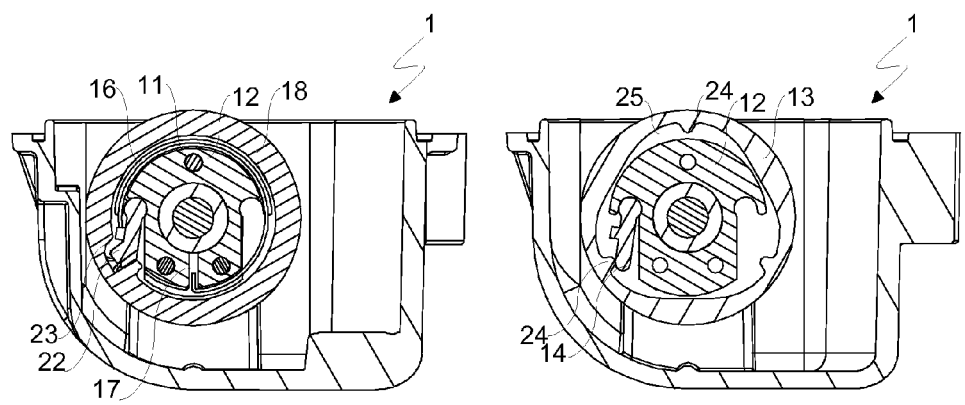
Fig.9  Fig.10  Fig.11  Fig.12

MECHANICAL TRANSMISSION DEVICE BETWEEN A DRIVE SHAFT AND TWO DRIVEN SHAFTS

The present invention relates to a mechanical transmission device, and in particular to a mechanical device which can transmit a torque from a drive shaft to two driven shafts.

European patent 1623217 discloses a device suitable for transmitting a torque from a drive shaft to a driven shaft, wherein the drive shaft is mechanically connected to a first engagement rotor which can be mechanically coupled or uncoupled with a second engagement rotor mechanically connected to the driven shaft and coaxially arranged around the first engagement rotor, by extracting or retracting, respectively, at least one mobile tooth which can rotate in a seat made in the first engagement rotor, a driving rotor being coaxially and rotatably arranged around the first engagement rotor and being provided with braking means, so that the relative rotation of the driving rotor with respect to the first engagement rotor causes the extension or the retraction of the mobile tooth according to the direction of this relative rotation.

When said device is applied to a motorized vehicle, for example a lawnmower, a differential must be connected between the driven shaft and the axles of the wheels for allowing a relative rotation between the latter when the device is engaged.

It is therefore an object of the present invention to provide a device free from said disadvantages, namely a device which allows to transmit a torque directly from the drive shaft to the wheels without a differential and anyway with the possibility of a relative rotation between the wheels. Said object is achieved with a device, whose main features are disclosed in the first claim, while other features are disclosed in the remaining claims.

Thanks to the doubling with adaptation of the components, as well as their particular arrangement with respect to the wheel connected to the drive shaft, the device according to the present invention allows not only the automatic and independent engagement and disengagement of two driven shafts, as in said known device, but also the relative rotation between these shafts, so as to not require the connection to a differential when it is applied to a motorized vehicle.

For reducing the dimensions and improving the reliability of the device according to the present invention, the driven shafts are preferably connected to each other by a coaxial pin which allows the mutual rotation of these shafts and the wheel is preferably provided with a plurality of longitudinal holes in which longitudinal pins are inserted, so that one or both ends of these pins protrude from both sides of the wheel and are inserted in longitudinal holes made in the first engagement rotors.

For improving the automatic engagement and disengagement of the device according to the present invention, the driving rotors are preferably provided with longitudinal openings crossed by said longitudinal pins, so as to allow a limited relative rotation between the wheel and the driving rotors. For the same purpose, the braking means preferably comprise a spring formed by a curved metal wire arranged in a circular groove made around the driving rotors, wherein the ends of the spring are bent outwards and can freely rotate along a circle arc with respect to the container which contains the first engagement rotors, the second engagement rotors and the driving rotors.

Figure 2:
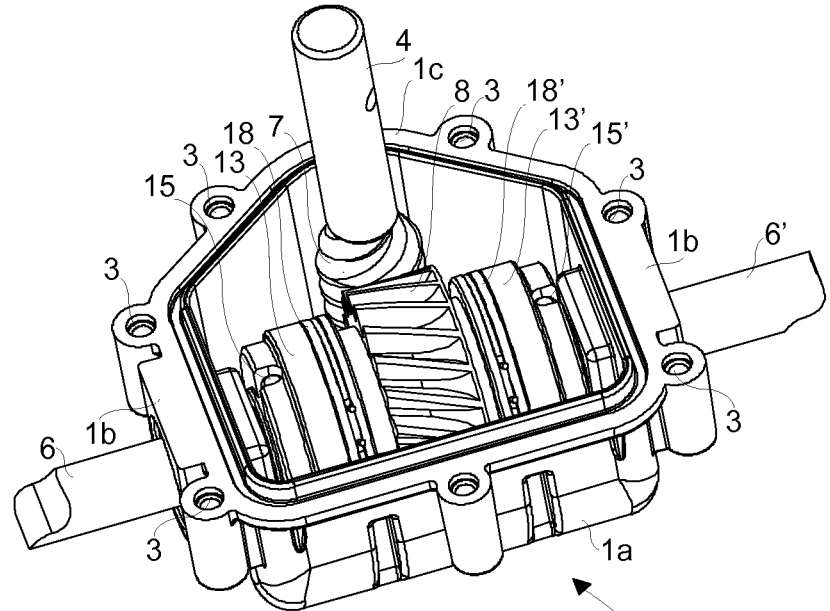
Figure 3:
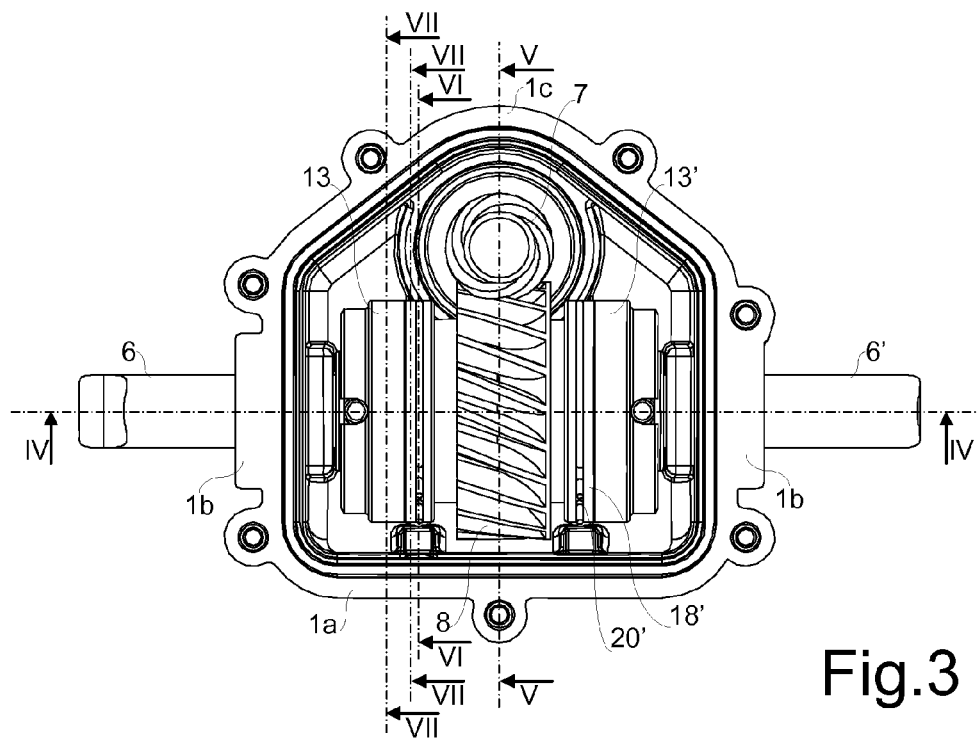
Figure 4:
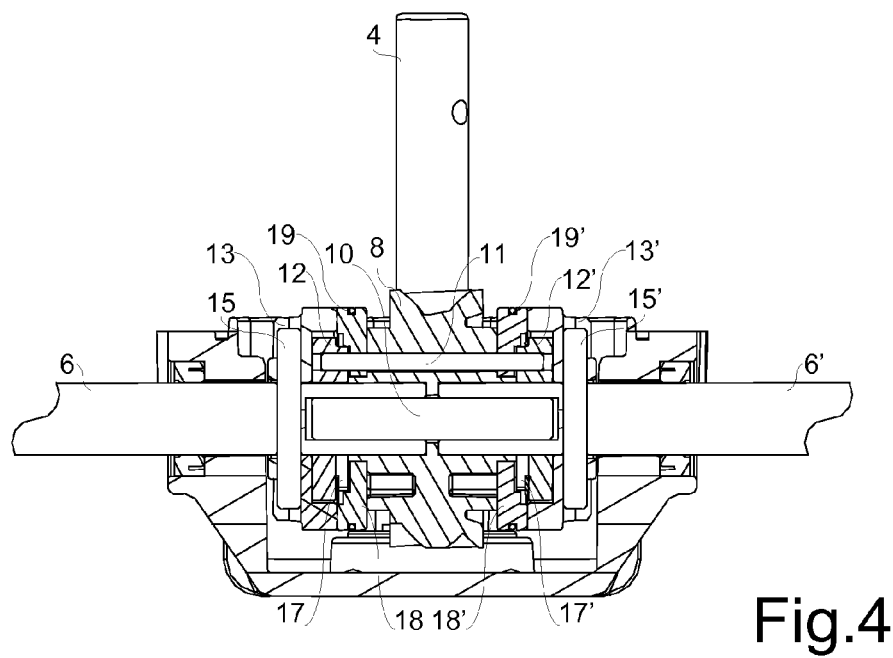
Figures 5, 6:
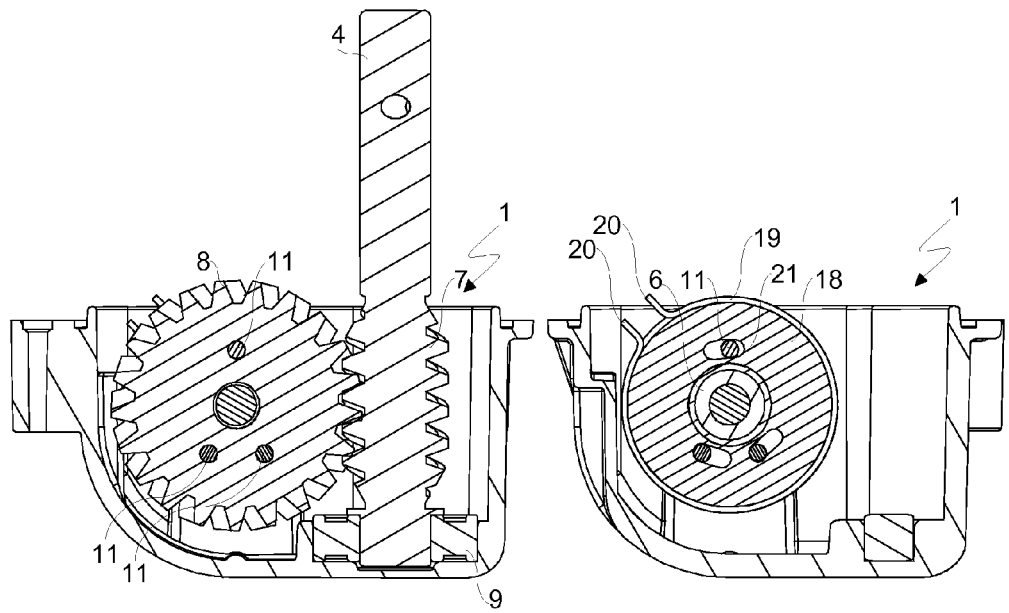
Figures 7, 8:
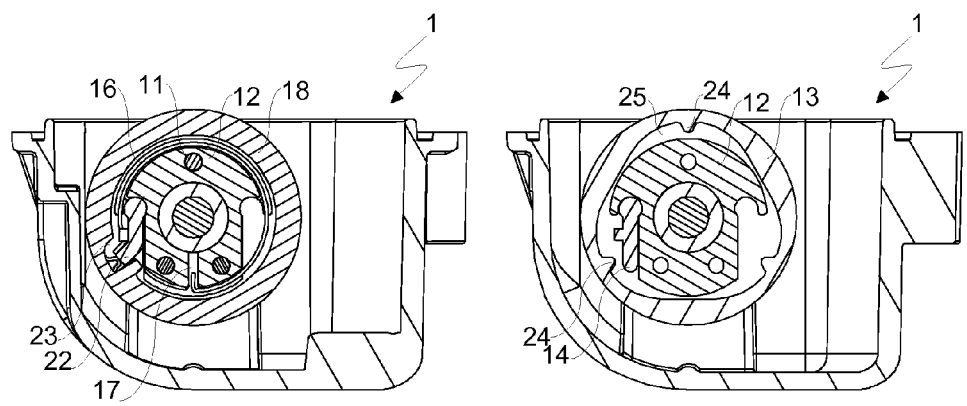

Further advantages and features of the device according to the present invention will become clear to those skilled in the art from the following detailed and non-limiting description of an embodiment thereof with reference to the attached drawings, wherein:

FIG. 1 shows a perspective view of the disengaged device;
FIG. 2 shows a perspective view of the device of FIG. 1, without cover and pulley;
FIG. 3 shows a top view of the device of FIG. 2;
FIG. 4 shows section IV-IV of FIG. 3;
FIG. 5 shows section V-V of FIG. 3;
FIG. 6 shows section VI-VI of FIG. 3;
FIG. 7 shows section VII-VII of FIG. 3;
FIG. 8 shows section VIII-VIII of FIG. 3; and
FIGS. 9 to 12 correspond to FIGS. 5 to 8, but with the engaged device.

Referring to FIGS. 1 to 8, it is seen that the transmission device according to the present invention comprises in a known way a container 1 which is closed by an upper cover 2 by means of a plurality of screws (not shown) inserted in corresponding seats 3 arranged along the upper edges of container 1. The container has a substantially prismatic shape, wherein the front wall 1a is perpendicular to two side walls 1b and rear wall 1c is curved outward. Cover 2 is provided with a hole in which a drive shaft 4 keyed to a transmission device, for example a pulley 5, is inserted for the connection to a motor.

Two driven shafts 6, 6' are arranged in a substantially perpendicular manner to drive shaft 4, so that they both cross a side wall 1b of container 1. A worm screw 7 mechanically coupled with a wheel 8, in particular a cogwheel provided with an axial hole in which at least one end of driven shafts 6, 6' is rotatably arranged, is integral with drive shaft 4, which is rotatably supported in container 1 by a bearing 9. Cogwheel 8 is thus mechanically connected to drive shaft 4, while driven shafts 6, 6' are mutually connected by a coaxial pin 10 which allows the mutual rotation of these shafts 6, 6'. Cover 2 is provided with another bearing (not visible in the figures) for rotatably supporting drive shaft 4. Worm screw 7 is arranged at least partially in the curvature of rear wall 1c of container 1. Cogwheel 8 is provided with a plurality of longitudinal holes in which longitudinal pins 11 are inserted, in particular three longitudinal pins which cross cogwheel 8, so that one or both ends of longitudinal pins 11 protrude from both ends of cogwheel 8. Longitudinal pins 11 are in turn inserted in longitudinal holes made in first engagement rotors 12, 12' coaxially arranged beside cogwheel 8, so that cogwheel 8 is located between these rotors 12, 12' and can rotate together with them. First engagement rotors 12, 12' are provided with an axial hole in which a driven shaft 6, 6' is rotatably arranged. First engagement rotors 12, 12' can be mechanically coupled or uncoupled with second engagement rotors 13, 13', coaxially arranged beside first engagement rotors 12, 12', by extracting or retracting, respectively, at least one mobile tooth 14 which can rotate in a seat made in first engagement rotors 12, 12', in particular close to their outer surface. Second engagement rotors 13, 13' are provided with an axial hole so that each driven shaft 6, 6' is keyed to a second engagement rotor 13, 13' by means of a transversal pin 15, 15'. Mobile tooth 14 of first engagement rotors 12, 12' is urged into its retracted position by elastic means 16, in particular by a spring formed by a curved metal wire arranged around first engagement rotors 12, 12'. An end of spring 16 urges mobile tooth 14 into its seat, while the other end is locked with respect to first engagement rotors 12, 12', for example is bent into a radial seat 17, 17' made therein. Driving rotors 18, 18' are coaxially and rotatably arranged around driven shafts 6, 6' between cogwheel 8 and first engagement rotors 12, 12'. Driving rotors 18, 18' are provided with braking means, which in the present embodiment comprise a spring 19, 19' formed by a curved metal wire arranged in a circular groove made around driving rotors 18, 18'. The ends 20, 20' of springs 19, 19' are bent outwards, so that they can abut against a member integral with container 1 or cover 2 for opposing a friction to the rotation of driving rotors 18, 18' with respect to container 1. Driving rotors 18, 18' are provided with longitudinal openings 21 crossed by longitudinal pins 11, so as to allow a relative rotation limited to about 20° between cogwheel 8 and driving rotors 18, 18'. Mobile tooth 14 of first engagement rotors 12, 12' is provided with a cursor 22 suitable for sliding in a groove 23 made in driving rotors 18, 18', so that the relative rotation of driving rotors 18, 18' with respect to first engagement rotors 12, 12' causes the extension or the retraction of mobile tooth 14 according to the direction of this relative rotation. FIGS. 7 and 8 show mobile tooth 14 in the retracted position, namely with drive shaft 4 mechanically uncoupled with driven shaft 6. This condition occurs when drive shaft 4 is not rotated by external means, for example by a motor, so that cogwheel 8, first engagement rotors 12, 12' and driving rotors 18, 18' are still, while driven shafts 6, 6' and second engagement rotors 13, 13' can freely rotate in both directions, since second engagement rotors 13, 13' are mechanically uncoupled with first engagement rotors 12, 12'.

Referring also to FIGS. 9 to 12, it is seen that when drive shaft 4 is rotated, for example by a motor, in a determinate direction, the rotation of drive shaft 4 is transmitted to first engagement rotors 12, 12' through worm screw 7 and cogwheel 8. Driving rotors 18, 18', braked by springs 19, 19' having ends 20, 20' which come into contact with container 1, rotate with respect to first engagement rotors 12, 12', so that mobile tooth 14 of first engagement rotors 12, 12' is extracted by the movement of the cursor in the groove of driving rotors 18, 18'. When mobile tooth 14 has been completely extracted, thereby rotating with first engagement rotors 12, 12', it abuts against at least one protrusion 24 projecting inside a cavity 25 made in second engagement rotors 13, 13' around first engagement rotors 12, 12', so that driven shafts 6, 6' are rotated by second engagement rotors 13, 13' mechanically coupled with first engagement rotors 12, 12' by means of mobile tooth 14 extracted by first engagement rotors 12, 12'.

When drive 5 stops, spring 16 urges mobile tooth 14 into its seat of first engagement rotors 12, 12', thereby slightly rotating driving rotors 18, 18' with respect to first engagement rotors 12, 12' and overcoming the friction opposed by springs 19, 19' to this relative rotation. If drive shaft 4 rotates in the inverse direction, the relative rotation of first engagement rotors 12, 12' with respect to driving rotors 18, 18' causes the retraction of mobile tooth 14 into its seat. The ends 20, 20' of springs 19, 19' can move along a circle arc of about 20° between container 1 and cover 2, so that engagement rotors 18, 18' can freely rotate along said arc with respect to container 1.

Possible modifications and/or additions may be made by those skilled in the art to the hereinabove disclosed and illustrated embodiment while remaining within the scope of the following claims.

The invention claimed is:

1. Device configured to transmit a torque from a drive shaft (4) to two driven shafts (6, 6'), wherein the drive shaft (4) is mechanically connected to a wheel (8), and first engagement rotors (12, 12') are coaxially arranged beside the wheel (8) so that the wheel (8) is located between the first engagement rotors (12, 12') and can rotate together with them, wherein the first engagement rotors (12, 12') are provided with an axial hole in which a driven shaft (6, 6') is rotatably arranged, wherein the first engagement rotors (12, 12') can be mechanically coupled or uncoupled with second engagement rotors (13, 13') coaxially arranged beside the first engagement rotors (12, 12'), by extracting or retracting, respectively, at least one mobile tooth (14) which can rotate in a seat made in the first engagement rotors (12, 12'), each driven shaft (6, 6') being keyed to a second engagement rotor (13, 13'), wherein driving rotors (18, 18') are coaxially and rotatably arranged around the driven shafts (6, 6') between the wheel (8) and the first engagement rotors (12, 12') and are provided with a braking mechanism (19, 19'), so that the relative rotation of the driving rotors (18, 18') with respect to the first engagement rotors (12, 12') causes the extension or the retraction of the at least one mobile tooth (14) of the first engagement rotors (12, 12') according to the direction of the relative rotation, wherein the wheel (8) is provided with a plurality of longitudinal holes in which longitudinal pins (11) are inserted so that one or both ends of the longitudinal pins (11) protrude from both sides of the wheel (8), the longitudinal pins (11) being inserted in longitudinal holes made in the first engagement rotors (12, 12') and the driving rotors (18, 18') being provided with longitudinal openings (21) crossed by the longitudinal pins (11), so as to allow a limited relative rotation between the wheel (8) and the driving rotors (18, 18').

2. The device according to claim 1, wherein the at least one mobile tooth (14) of the first engagement rotors (12, 12'), when it is extracted, abuts against at least one protrusion (24) projecting inside a cavity (25) made in the second engagement rotors (13, 13') around the first engagement rotors (12, 12').

3. The device according to claim 1, wherein the at least one mobile tooth (14) of the first engagement rotors (12, 12') is urged into its retracted position by an elastic member (16).

4. The device according to claim 3, wherein said elastic member (16) comprises a spring formed by a curved metal wire arranged around the first engagement rotors (12, 12'), wherein an end of the spring (16) urges the at least one mobile tooth (14) into its seat, while the other end is locked with respect to the first engagement rotors (12, 12').

5. The device according to claim 1, wherein said braking mechanism (19, 19') comprises a spring formed by a curved metal wire arranged in a circular groove made around the driving rotors (18, 18').

6. The device according to claim 5, wherein ends (20, 20') of the spring (19, 19') are bent outwards, so that they can abut against a member integral with a container (1) or with a cover (2) which contain the first engagement rotors (12, 12'), the second engagement rotors (13, 13') and the driving rotors (18, 18') for opposing a friction to the rotation of the driving rotors (18, 18') with respect to the container (1).

7. The device according to claim 6, wherein the ends (20, 20') of the spring (19, 19') and the driving rotors (18, 18') can freely rotate along a circle arc with respect to the container (1).

* * * * *